United States Patent
Sasaki

(10) Patent No.: US 6,415,096 B1
(45) Date of Patent: Jul. 2, 2002

(54) TIME CODE SIGNAL GENERATOR FOR GENERATING A TIME CODE RECORDED WITH VIDEO SIGNALS

(75) Inventor: Koji Sasaki, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/154,293

(22) Filed: Sep. 16, 1998

(30) Foreign Application Priority Data

Sep. 16, 1997 (JP) .............................. 9-250227

(51) Int. Cl.[7] .................................. H04N 5/76
(52) U.S. Cl. ............... 386/65; 386/60; 386/62
(58) Field of Search .................. 386/52, 60, 62, 386/65, 4, 131; 360/13, 18, 49, 51, 72.2; H04N 5/76, 5/92, 9/79

(56) References Cited

U.S. PATENT DOCUMENTS

| | | |
|---|---|---|
| 4,503,470 A | 3/1985 | Mita et al. |
| 4,532,557 A | 7/1985 | Larkins |
| 4,766,504 A * | 8/1988 | Narusawa et al. ............ 386/65 |
| 5,892,552 A * | 4/1999 | Kim ............................ 386/65 |

FOREIGN PATENT DOCUMENTS

| | | |
|---|---|---|
| EP | 0 774 753 | 5/1997 |
| FR | 2 444 303 | 7/1980 |

OTHER PUBLICATIONS

European Search Report dated Mar. 26, 2001.

* cited by examiner

*Primary Examiner*—Thai Tran
(74) *Attorney, Agent, or Firm*—Ratner & Prestia

(57) ABSTRACT

A time code generator for a time code recording apparatus, in which, when recording video signals at a speed of N times, a corresponding time code is generated. The time code value is incremented from the initial value of time code at N frame steps, the time code value skipped at this time is interpolated, and the incremented time code value and the interpolated time code value are arranged and issued in a specified sequence.

6 Claims, 4 Drawing Sheets

TIME CODE SIGNAL GENERATOR FOR GENERATING A TIME CODE RECORDED WITH VIDEO SIGNALS

FIELD OF THE INVENTION

The present invention relates to a time code signal generator used in a time code signal recording apparatus.

BACKGROUND OF THE INVENTION

Hitherto, when recording by a magnetic recording and reproducing apparatus, it is typical to record video signal in real time. In other words, 60 minutes worth of video signals are recorded in 60 minutes. Such prior art is disclosed, for example, in U.S. Pat. No. 4,503,470.

FIG. 4 shows a constitution of a time code signal generator for a time code recording apparatus of a conventional magnetic recording and reproducing apparatus. In FIG. 4, a time code preset circuit 20 generates an initial value of a time code. A system control circuit 2 generates a mode signal 9 for setting the operating state of recording and reproducing. In this case, the mode signal 9 includes information indicating that the recording speed is the same speed as the reproducing speed.

The initial value of the time code generated in the time code preset circuit 20, the mode signal 9, and control signal 21 are put into a time code counter 22. As the control signal 21, usually, a pulse signal changing in the frame period of video signal is used. This control signal changes, in the case of an NTSC signal, in 1/30 second.

The time code counter 22 counts every time the control signal 21 changes from the initial value, that is, every 1/30 second, and issues time code information. The time code information is put into a time code output circuit 23. In this circuit, in order to record in a recording track, it is converted into a one-bit serial signal, and is sent to a time code recording circuit (not shown) as recording time code 5.

This is a prior art recording at the same speed as the reproducing speed.

Recently, however, for non-linear editing, video signals are often recorded in a hard disk or transmitted through a network, and in such a case it is sometimes desirable to record or transmit in a shorter time than the real time, for example, in one-fourth time. In this case, the video signals are recorded, reproduced or transmitted at a speed of four times. Naturally, the same is required when dubbing between magnetic recording and reproducing apparatuses.

In the case of NTSC, four frames are recorded, reproduced or transmitted in 1/30 second. In such time code recording apparatus of magnetic recording and reproducing apparatus, it is required to increase the signal processing speed and shorten the time necessary for recording, and a magnetic recording and reproducing apparatus which provides simplified recording of all information securely and at high speed is desirable.

However, the existing time code recording apparatus is limited to an apparatus for recording at normal speed . To realize high speed recording of N times, it is theoretically possible to increase the tape speed N times and increase the oscillation frequency of the time code generator N times, but since the operating frequency is a high speed, the operation timing is critical, and the existing circuit does not operate normally.

SUMMARY OF THE INVENTION

A time code signal generator is applicable to high speed recording More specifically, an apparatus is capable of recording while maintaining the reliability of time code information necessary for a video signal (specified timing and continuity) without radically changing the operating speed of the conventional circuit.

For generating a corresponding time code when recording video signals at a speed of N times, included are counting means for incrementing the time code value in N frame steps from the reference time code value of initial value, correcting means for interpolating the skipped time code value, and means for arraying the incremented time code value and interpolated time code value in a specified sequence, and issuing serially. Hence, N times speed time code corresponding to N times speed video signal can be generated securely.

DETAILED DESCRIPTION OF THE PREFERRED EMBODIMENT

A preferred embodiment of the invention is described below by referring to FIG. 1 to FIG. 3. In all drawings, it is assumed that N=4.

Figure 1:
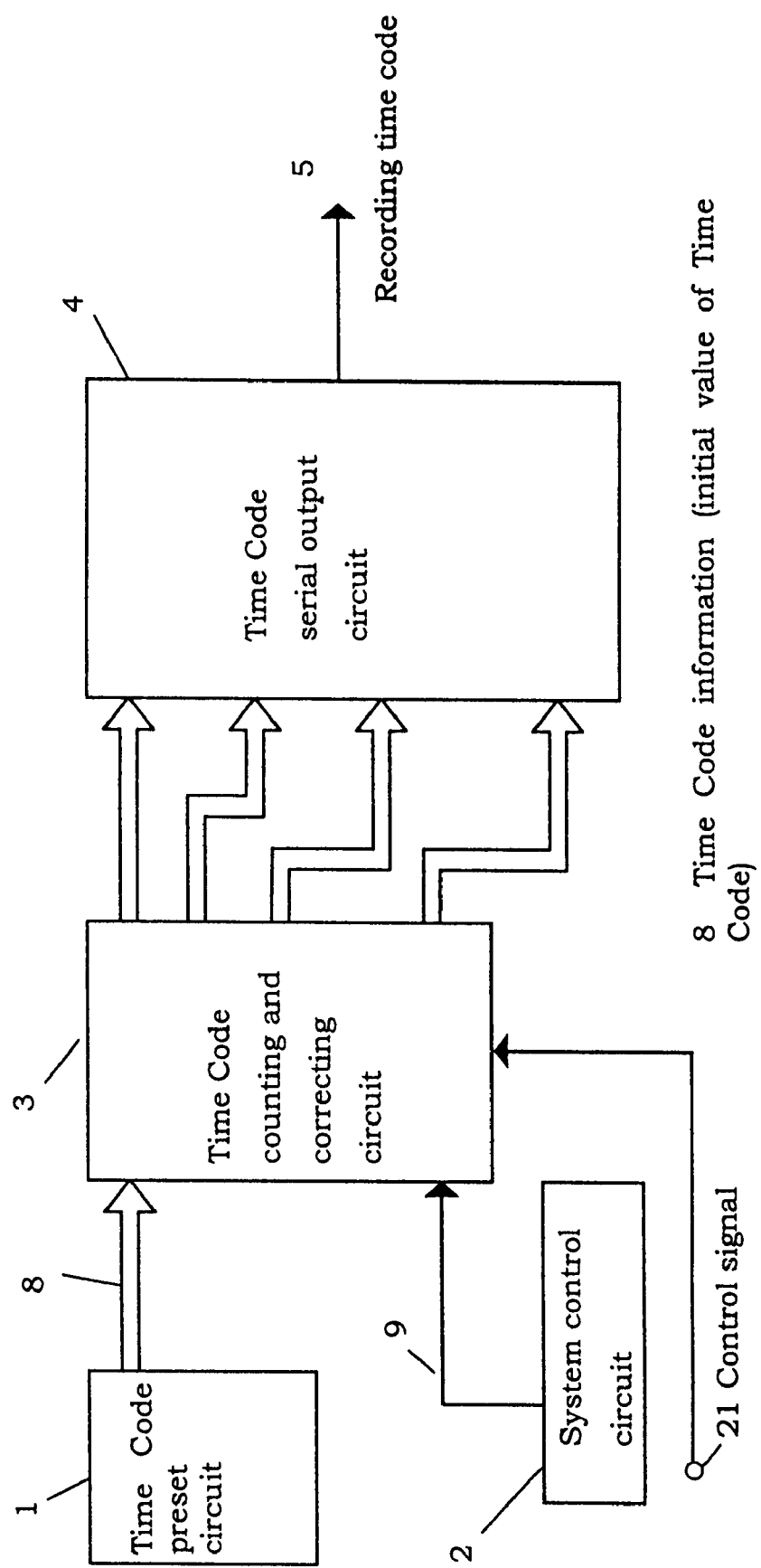
FIG. 1 is a block diagram of a time code generator for a time code recording apparatus in a magnetic recording and reproducing apparatus in accordance with an exemplary embodiment of the invention.

FIG. 1 is a block diagram of a time code generator for a time code recording apparatus in a magnetic recording and reproducing apparatus in an exemplary embodiment of the invention. In FIG. 1, a time code preset circuit 1 is a circuit for generating an initial value of time code 8. A system control circuit 2 is a circuit for changing over recording or reproducing mode signal 9, and setting the recording speed. A time code counting and correcting circuit 3 is a circuit for counting up the control signal 21 on the basis of the mode signal 9 issued from the system control circuit 2,using the initial value of time code 8 issued from the time code preset circuit 1 as the initial value, creating N=4 specified correction values, operating the count value with the correction values, and newly creating N=4 time code values. A time code serial output circuit 4 arranges the N=4 time code information values issued from the time code counting and correcting circuit 3 in the sequential order, and issuing serially in order to record on a recording track.

Figure 2:
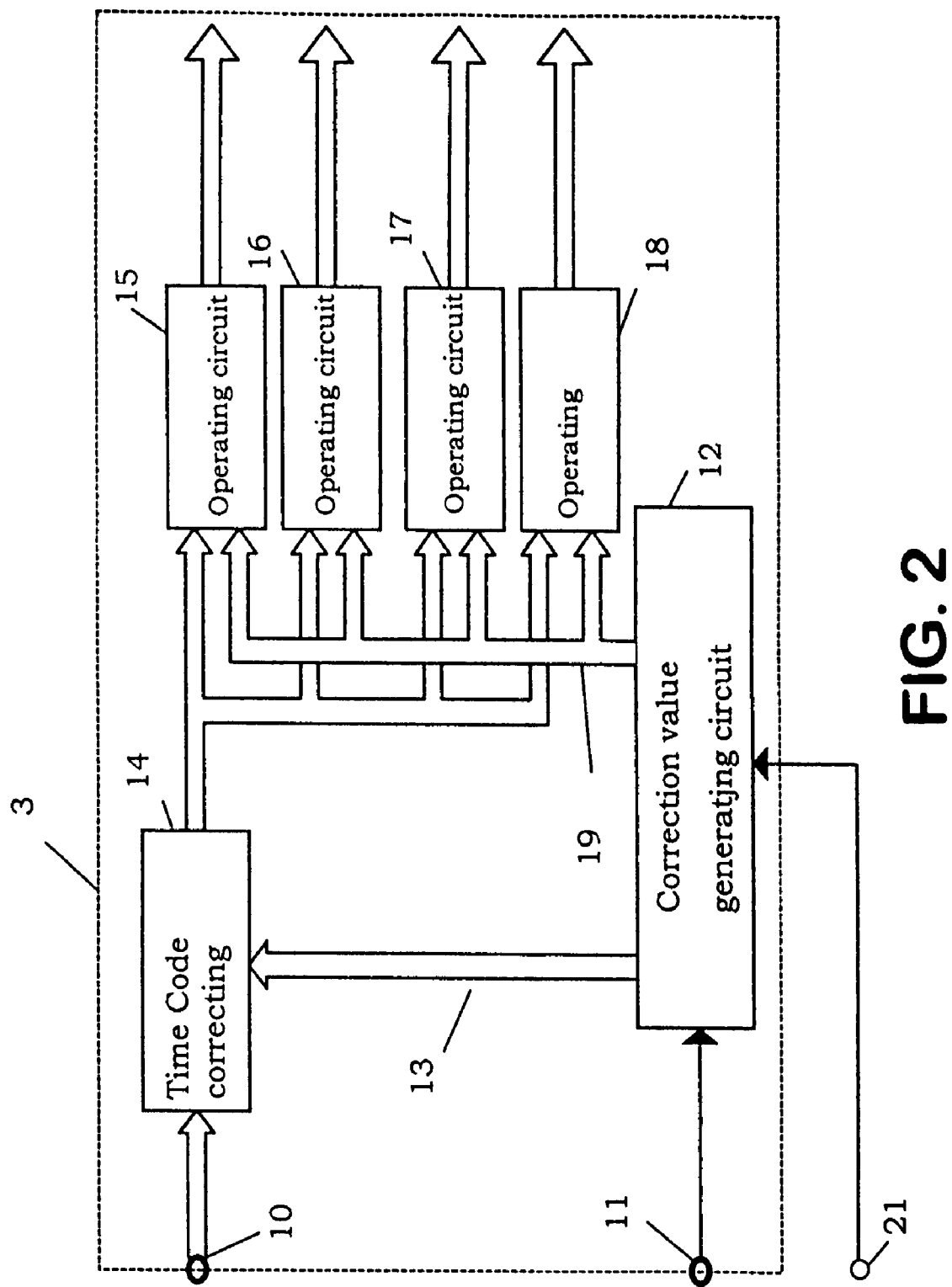
FIG. 2 is a block diagram of a time code counting and correcting circuit in accordance with an exemplary embodiment of the invention.

FIG. 2 is a block diagram showing the details of the time code counting and correcting circuit 3 in FIG. 1. In FIG. 2, a terminal 10 is a terminal for receiving the initial value of time code 8 issued from the time code preset circuit 1, and terminal 11 is a terminal for receiving the mode signal 9 issued from the system control circuit 2. A correction value generating circuit 12 is a circuit for generating a count-up signal 13 by counting up at every N=4 whenever the control signal 21 is changed, in the case of the mode signal for recording at N=4 times speed, on the basis of the mode signal 9 entered from the terminal 11, and also generating N=4 time code interpolation signals 19. A time code correcting circuit 14 is a circuit for adding the initial value of time code received through the terminal 10 and the count-up signal 13 issued from the correction value generating circuit 12. A first operating circuit 15, a second operating circuit 16, a third operating circuit 17, and a fourth operating circuit 18 are operating circuits for adding four time code interpolation signals 19 issued from the correction value generating circuit 12, and the corrected time code information value issued from the time code correcting circuit 14, and from the individual operating circuits, four new time code information values are issued to the time code serial output circuit 4.

Figure 3:
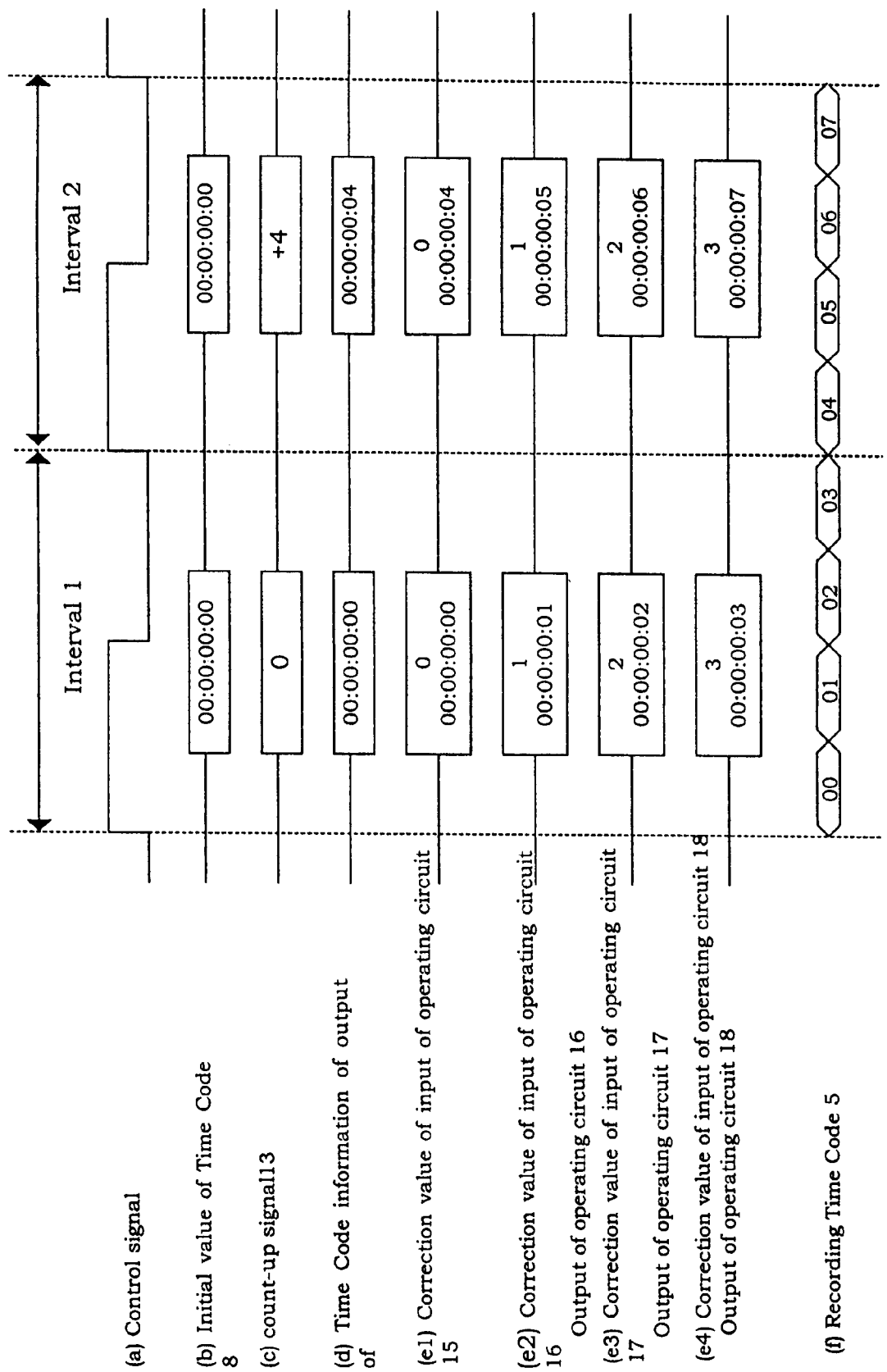
FIG. 3 is a timing chart for explaining the details of operation of an exemplary embodiment of the invention.
Figure 4:
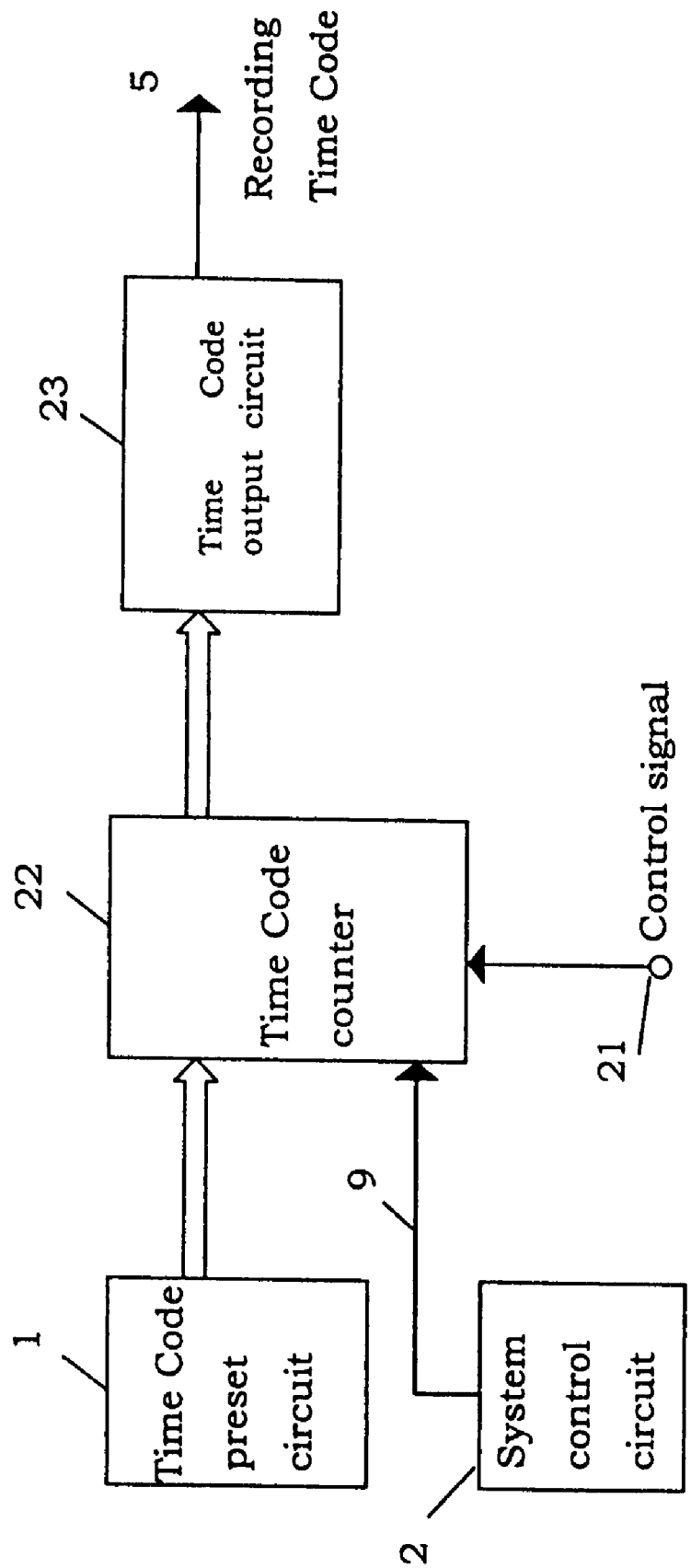
FIG. 4 is a block diagram of a time code generator for a time code recording apparatus in a conventional magnetic recording and reproducing apparatus.

FIG. 3 is a timing chart for explaining the operation of an exemplary embodiment of the invention. In FIGS. 3(a) and 3(b), interval 1 and interval 2 show reference periods for processing. This interval corresponds to one cycle in (a) below. FIG. 3 (a) shows a control signal 21 for setting the timing of recording, which changes in every 1/30 second same as in the prior art in FIG. 4. FIG. 3 (b) shows the initial value of time code 8 issued from the time code preset circuit 1, and the time code information value (fixed value) upon start of recording is issued.

First, in interval 1 in FIG. 3(b), as the initial value of time code 8 issued from the time code preset circuit 1, the time code information value 8 (hour: minute: second: frame=00: 00: 00: 00) is put into the time code correcting circuit 14 in the time code counting and correcting circuit 3. At this time, since the speed is four times, the system control circuit 2 gives the mode signal 9 showing four times speed to the correction value generating circuit 12 through the terminal 11. The correction value generating circuit 12 generates a count-up signal 13 (initial value 0) in interval 1.

In FIG. 3 (c), at every change of the control signal 21, that is, the count-up signal 13 issued from the correction value generating circuit 12, a numerical value for counting up at every numerical value corresponding to the tape speed (N=4 in the diagram) is issued.

In the time code correcting circuit 14, this count-up signal 13 and the initial value of time code 8 are added, and the time code information in FIG. 3(d) is issued. In the correction value generating circuit 12, further on the basis of N=4, time code interpolation signals 19 of 0, 1, 2, 3 are issued, and the interpolation signal of 0 is given to the operating circuit 15, the interpolation signal of 1 is given to the operating circuit 16, the interpolation signal of 2 is given to the operating circuit 17, and the interpolation signal of 3 is given to the operating circuit 18. As shown in FIGS. 3(e1) to 3(e4) of interval 1, in the operating circuit 15, the time code information value (00: 00: 00: 00) issued from the time code correcting circuit 14 and the correction value of 0 issued from the correction value generating circuit 12 are operated, and a new time code information value (00: 00: 00: 00) is issued. Similarly, in the operating circuit 16, by the operation of the time code information value (00: 00: 00: 00) and the correction value of 1, a new time code information value (00: 00: 00: 00) is issued. In the operating circuit 17, by the operation of the time code information value (00: 00: 00: 01) and the correction value of 2, a new time code information value (00: 00: 00: 02) is issued. In the operating circuit 18, by the operation of the time code information value (00: 00: 00: 00) and the correction value of 3, a new time code information value (00: 00: 00: 03) is issued.

FIGS. 3 (e1) to 3(e4) show the time code interpolation signal 19 (top) entered in the operating circuits 15 to 18 and the time code information value (bottom) issued after operation process.

In interval 2, the initial value of time code issued from the time code preset circuit 1 in 3(b) is similar to that in interval 1, and the time code information value 8 (hour: minute: second: frame=00: 00: 00: 00) is put into the time code correcting circuit 14 in the time code counting and correcting circuit 3.

In this interval, as shown above, the correction value generating circuit 12 issues "+4" signal as the count-up signal 13 as shown in FIG. 3 (c). This value of "+4" of the count-up signal 13 is added to the initial value of time code (00: 00: 00: 00) shown in FIG. 3(b) by the time code correcting circuit, and a new time code information value is obtained in FIG. 3(d). The new time code information value (00: 00: 00:04) in (d) is given to the operating circuit 15, operating circuit 16, operating circuit 17, and operating circuit 18, and operated similarly, and as shown in FIGS. 3(e1) to 3(e4) in interval 2, new time code information values (00: 00: 00: 04 to 00: 00: 00: 07) are issued. The issued time code information values are put into the time code serial output circuit 4. In the time code serial output circuit 4, four time code values entered parallel are sequentially arranged serially as shown in FIG. 3(f), and converted into one-bit serial signals, and issued as recording time code 5. This signal is recorded in the recording track on the magnetic tape through the recording circuit and recording head not shown in the drawing. The track in which the time code is recorded may be either linear track or the helical track on the magnetic tape.

By repeating this operation sequentially, when recording at four times speed, the time code information can be recorded continuously. The foregoing description is an example of recording at four times speed (N=4). When recording at other speeds, however, similar execution is possible. That is, in the case of N times speed, the count-up signal is issued as +N, and the interpolation values are issued as 0, 1, 2, . . . , N−1. Incidentally, addition of 0 does not actually change the numerical value, and it is only intended to match the timing with other circuits. Thus, calculation is not necessary.

Thus, according to the invention, by comprising the time code counting and correcting circuit for counting N steps depending on the recording speed and interpolating the time code, and the time code serial output circuit, when recording at other than normal speed, the operating speed of the circuit is not required to be increased by N times, and the time code information can be recorded securely while maintaining the continuity.

As many apparently widely different embodiments of this invention may be made without departing from the spirit and scope thereof, it is to be understood that the invention is not limited to the specific embodiments thereof except as defined in the appended claims.

What is claimed is:

1. A time code generator for generating a time code to be recorded together with video signals of N times speed, N being an integer of 2 or more, comprising:

system control means for issuing a mode signal for setting an operating state of N times speed recording of said video signals, time code preset means for setting an initial value of said time code, time code counting and correcting means for receiving said mode signal and said initial value of said time code, and for outputting N values of said time code at every period of a control signal, time code signal output means for arranging and issuing the output of said time code counting and correcting means continuously in time sequence.

2. The time code generator of claim 1, wherein said time code counting and correcting means includes correcting value generating means which comprises:
   a counter having an output which increases by N response to said every control signal,
   a generator for generating at least N−1 interpolating values for said time code.

3. The time code generator of claim 2, wherein said time code counting and correcting means includes time code correcting means which comprises:
   an adder which adds said initial value of said time code and the output of said counter to obtain an adder output.

4. The time code generator of claim 3, wherein said time code counting and correcting means includes operating means which comprises at least N−1 operating units each one of which receives the adder output, adds interpolating values of time code thereto, and generates said time code.

5. A time code generator for generating a time code to be recorded together with video signals of N times speed, N being an integer of 2 or more, comprising:

system control means for issuing a mode signal for setting an operating state of N times speed recording of said video signals, discrete time code generating means for generating a discrete time code output which includes a discrete time code to be incremented every N frames, operating means for receiving the output of said discrete time code generating means, and for generating said time code by interpolation, and time code signal output means for arranging and issuing said time code generated by said operating means continuously in a time sequence.

6. The time code generator of claim 5, wherein the operating means comprises at least N−1 operating circuits each one of which receives the discrete time code output of said discrete time code generating means, adds 1 frame or N−1 frame thereto, and generates said time code.

* * * * *